(12) United States Patent
Gueron et al.

(10) Patent No.: US 9,268,564 B2
(45) Date of Patent: Feb. 23, 2016

(54) VECTOR AND SCALAR BASED MODULAR EXPONENTIATION

(75) Inventors: Shay Gueron, Haifa (IL); Vlad Krasnov, Nesher (IL)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 13/994,717

(22) PCT Filed: May 30, 2012

(86) PCT No.: PCT/US2012/040053
§ 371 (c)(1),
(2), (4) Date: Jun. 15, 2013

(87) PCT Pub. No.: WO2013/180712
PCT Pub. Date: Dec. 5, 2013

(65) Prior Publication Data
US 2014/0229716 A1 Aug. 14, 2014

(51) Int. Cl.
G06F 7/72 (2006.01)
G06F 9/30 (2006.01)

(52) U.S. Cl.
CPC .............. *G06F 9/3001* (2013.01); *G06F 7/723* (2013.01)

(58) Field of Classification Search
None
See application file for complete search history.

(56) References Cited

U.S. PATENT DOCUMENTS

| | | | |
|---|---|---|---|
| 6,272,512 B1 * | 8/2001 | Golliver et al. | 708/622 |
| 6,292,886 B1 * | 9/2001 | Makineni et al. | 712/222 |
| 2006/0059221 A1 | 3/2006 | Carlson | |
| 2009/0067617 A1 | 3/2009 | Trichina | |
| 2013/0332707 A1 * | 12/2013 | Gueron et al. | 712/222 |
| 2014/0013086 A1 * | 1/2014 | Gopal et al. | 712/221 |
| 2014/0082328 A1 * | 3/2014 | Gopal et al. | 712/208 |
| 2014/0229716 A1 * | 8/2014 | Gueron et al. | 712/222 |
| 2014/0237218 A1 * | 8/2014 | Gopal et al. | 712/222 |

OTHER PUBLICATIONS

Gueron, Shay, "Efficient software implementations of modular exponentiation" J Cryptogr Eng., Apr. 5, 2012, 2:31-43, Springer-Verlag, Haifa, IL.

Gueron, Shay, "Software Implementation of Modular Exponentiation, Using Advanced Vector Instructions Architectures", Arithmetic of Finite Fields, Jul. 16, 2012, pp. 119-135, Springer Berlin Heidelberg.

International Searching Authority, "Notification of Transmittal of the International Search Report and the Written Opinion of the International Searching Authority," mailed Feb. 7, 2013, in International application No. PCT/US2012/040053.

Gueron, Shay et al., "Speeding up Big-Numbers Squaring", 2012 Ninth International Conference on Information Technology-New Generations, 2012, pp. 821-823.

Chia-Long Wu, "An efficient common-multiplicand-multiplication method to the Montgomery algorithm for speeding up exponentiation," Information Sciences, vol. 179, Issue 4, 2009, pp. 410-420.

* cited by examiner

*Primary Examiner* — David H Malzahn
(74) *Attorney, Agent, or Firm* — Trop, Pruner & Hu, P.C.

(57) ABSTRACT

An embodiment includes a method for computing operations, such as modular exponentiation, using a mix of vector and scalar instructions to accelerate various applications such as encryption protocols that rely heavily on large number arithmetic operations. The embodiment requires far fewer instructions to execute the operations than more conventional practices. Other embodiments are described herein.

20 Claims, 12 Drawing Sheets

Redundant-to-$2^m$ conversion
Input: U in redundant representation using k digits (assumption: $U < 2^{m \times k}$)
Output: U in radix $2^m$ representation
Flow:
1. temp = 0
2. For i = 0 to k-1
    a. temp = temp + $u_i$
    b. $v_i$ = temp mod $2^m$
    c. temp = temp/$2^m$
End for
Return V

B = eb9a100d6e586233||5060810345189 5a2||5572dfe2de045f13||132ba675e3adb497

A in radix $2^{29}$ =
000000000fa54401||00000000150b2793||000000006ff50a||000000001140153a||0000000001
0928e93||000000000010a1ac7||00000000f0b17f6||00000000146a654b||00000000055091ad B in radix $2^{29}$ =
00000000eb9a10||000000005bfc5bc||00000000001adcb0c||000000008cd4182||000000000000
95a2557||000000005bfc5bc||0000000117c4c4||000000195d33af||000000003adb497

A + B in redundant representation =
000000001e5ee11||000000016b8f29f||000000093d368c||000000011c1b7c6||000000001
9ecb3ea||0000000006c9e083||000000001022dcba||0000002dc798fa||00000008fe4644

A + B in radix $2^{29}$ =
000000001e5ee11||000000016b8f29f||000000093d368c||000000011c1b7c6||000000001
9ecb3ea||0000000006c9e083||000000001022dcbb||0000000dc798fa||00000008fe4644 t = 0x000000001fedcba98 t × A in redundant representation =
01f38b30a4869a98||29fe5dc375b44d48||00df6ab21b1ac1f0||226c89ee9750be70||2112420fb
2ef7548||021306c96a787c28||1e05123ba966f610||28bd901be338a288||0a9b1753885a30b8 t × A in radix $2^{29}$ =
00000000f9c598f||000000001478 88b3||000000001cafa2e1||00000000e7f116c||0000000001
fe2ceee||000000000387ab9a||000000001aa10e0f||00000000f5376f1||00000000018115d24||
00000000085a30b8

FIG. 4

Word-by-word computation of NRMM (WW-NRMM)
Input:
M, an odd modulus such that $2^{n-1} < M < 2^n$ (M has n bits in binary form)
Integer $1 < m < 64$, such that if $k = \lceil n/m \rceil$, then $k \times m > n+2$.
$A, B < 2M < 2^{n+1}$ given in radix $2^m$ ($a_i$, $b_i$ denote their radix $2^m$ digits)
Pre-computed: $k_0 = -M^{-1} \bmod 2^m$
Output: $X = NRMM(A, B)$
Flow:
1.     $X = 0$
2.     For $I = 0$ to $k-1$
    2.1. $X = X + A \times b_i$
    2.2. $x_0 = X \bmod 2^m$
    2.3. $y = x_0 \times k_0 \bmod 2^m$
    2.4. $X = X + Mxy$
    2.5. $X = X/2^m$
3.     Output X

FIG. 6

[VNRMM]: Vectorized implementation of NRMM (A, B)
Input: A, B and M, in radix $2^m$
Pre-computed: $k_0 = M^{-1}$ mod M
Output: X = NRMM (A, B)
Flow:
1.     $x_0 = 0$, $X_q, ..., X_0 = 0$
2.     $a_0 = A$ mod $2^m$ (i.e., digit 0 of A)
3.     $m_0 = M$ mod $2^m$ (i.e., digit 0 of M)
4.     load digits 1, 2, ..., (k-1) of A into SIMD registers $A_1..A_q$ (q as required)
5.     load digits 1, 2, ..., (k-1) of M into SIMD registers $M_1..M_q$ (q as required)
6.     addCounter = 0
7.     for I = 0 to k-1
  7.1. $x_0 = x_0 + a_0 \times b_i$
  7.2. T = Broadcast $b_i$
  7.3. for j = 1 to q
      7.3.1. $X_j = X_j + A_j \times T$
  7.4. $y_0 = x_0 \times k_0$ mod $2^m$
  7.5. $x_0 = x_0 + m_0 \times y_0$
  7.6. T = Broadcast $y_0$
  7.7. for j = 1 to q
      7.7.1. $x_j = x_j + M_j \times T$
  7.8. $x_0 = x_0 >> m$
  7.9. $x_0 = x_0 + x1[0]$
  7.10. $X_q, ..., X_1 = X_q, ..., X_1 >> 64$
  7.11. add Counter = add Counter + 2
  7.12. if addCounter $\geq (2_{64-2m})$
      7.12.1. perform X "cleanup"
      7.12.2. addCounter = 0
End for
8.     Convert $X_q, ..., X_1, x_0$: from redundant representation to radix $2_m$ (using method of Figure 3)

FIG. 7

W-ary module exponentiation using VNRMM
Input: A, X and M – n-bit integers, in radix $2^{64}$ representation
Pre-computed: $k_0 = M^{-1} \bmod 2^{64}$, $RR = 2^{2n} \bmod M$, w – window size
Output: $C = A^X \bmod M$
Flow:
1. Let m be the largest integer such that $2^{64-2m} > 2 \times [n/m]$
2. Let A`, RR` and M` be A, RR and M converted to normalized radix $2^m$
3. Let X be $x0 + x1 \times 2^W + \ldots + xj \times 2^{jw}$, where $0<x0, x1\ldots xj<2^W$
4. Let $k_0` = k_0 \bmod 2^m = M^{-1} \bmod 2^m$
5. C2 = NVRMM (RR`, RR`) (congruent to $2^{4n-kxm} \bmod M0$)
6. C2 = VNRMM (C2, 4kxm – 4n) (congruent to $2^{2kxm} \bmod M$)
7. Table [0] = VNRMM (C2, 1)
8. Table [1] = VNRMM (C2, A`)
9. For I = 2, .., $2^{w-1}$-1 do
    9.1. Table [ix2] = VNRMM (M[i], M[i])
    9.2. Table [ix2] = VNRMM (M[I x 2], M[i])
End for
10. h = m[xj]
11. For I = j-1, ...0 do
    11.1. For 1 = 1, ..., w
        11.1.1. h = VNRMM (h,h)
    End for
    11.2. h = VNRMM (h, xi)
End for
12. h = VNRMM (h, 1)
13. hh = radix-$2^m$-to-radix-$2^{64}$ (h)
14. return hh The access to the Table is side channel protected

FIG. 8

[VNRMSQR]: Vectorized implementation of NRMSQR (A)
Input: A and M, in radix $2^m$
Pre-computed: $k_0 = M^{-1}$ mod M
Output: X, such that X mod M = $A^2$ x $2^{-k \times m}$ mod M and X<$2^{n+1}$
Flow:
1. Let A` = Ax2 (i.e. a`$_i$ = $a_i$ << 1)
2. Let s be the number of 64-bit elements in a SIMD register
3. $X_{2q+1}$, ..., $X_0$ = 0
//First stage – perform the square
4. load digits 0, 2, ..., (k-1) of A` into SIMD registers $A_0..A_q$ load digits 0, 2, ..., (k-1) of A` into SIMD registers A`$_0$..A`$_q$
5. for I = 0 to [k-1/s]
  5.1. for j = 0 to s-1
      5.1.1. T = Broadcast $a_{i \times s+j}$
      5.1.2. $X_{2q+1}$, ..., $X_i$ = $X_{2q+1}$, ..., $X_i$ + (A`$_q$, ..., A`$_{i+1}$, $A_i$ * T <<$2^{64 \times (i \times s+j)}$)
6. $m_0$ = M mod $2^m$ (i.e., digit 0 of M)
7. $x_0$ = $X_0$ [0]
8. load digits 1, 2, ..., (k-1) of M into SIMD registers $M_0..M_q$
9. $X_q$, ..., $X_0$ = $X_q$, ..., $X_0$ >> 64
10. for I = 0 to k-1
  10.1. $y_0$ = $x_0$ x $k_0$ mod $2^m$
  10.2. $x_0$ = $x_0$ x $m_0$ mod $y_0$
  10.3. T = Broadcast $y_0$
  10.4. $X_q$, ..., $X_0$ = $X_q$, ..., $X_0$ + ($M_0$, ..., $M_0$ * T)
  10.5. $x_0$ = $x_0$ >> m
  10.6. $x_0$ = $x_0$ + $X_0$ [0]
  10.7. $X_q$, ..., $X_0$ = $X_q$, ..., $X_0$ >> 64
  End for
11. for j = 1 to q
  11.1. $X_j$ = $X_j$ + $X_{j+q+1}$
12. Convert $X_q$, .., $X_1$, $x_0$ from redundant representation to radix $2^m$ according to Algorithm 1.

The access to the Table is side channel protected

FIG. 10

VECTOR AND SCALAR BASED MODULAR EXPONENTIATION

BACKGROUND

Cryptographic algorithms, such as RSA2048 and others that underlie Secure Socket Layer (SSL) connections, Transport Layer Security (TLS) connections, and the like create heavy computational loads for supporting computing devices (e.g., servers).

Conventional software implementations of RSA are "scalar code" that use arithmetic logic unit (ALU) instructions (e.g., ADD/ADC/MUL). Improvements in the performance of ADD/ADC/MUL have made the scalar implementations more efficient on modern processors. Still, single instruction multiple data (SIMD) or "vector" architectures can provide improvements over scalar code. SIMD is an architecture where a single instruction computes a function of several inputs, simultaneously. These inputs are called "elements" and reside in registers that hold a few of the inputs together. Early SIMD architectures used instructions (e.g., MMX) that operate on 64-bit SIMD registers. Other architectures (e.g., SSE) introduced 128-bit registers. Still other architectures (e.g., advanced vector extensions (AVX), AVX2, and the like) extend the SSE architecture in several respects by, for example, introducing non-destructive destination and floating point operations over 256-bit registers.

Many methods (e.g., discrete cosine transform (DCT) used in media processing) operate on multiple independent elements, and are therefore inherently suitable for SIMD architectures. However, big-number (e.g., multi-digit) arithmetic, which is important in RSA applications and many other applications, is not naturally suitable for vector architectures considering, for example, the digits of multi-digit numbers are not independent due to carry propagation during arithmetic operations such as addition and multiplication.

BRIEF DESCRIPTION OF THE DRAWINGS

FIG. 3 depicts a method for redundant representation conversion in an embodiment of the invention.

FIG. 4 provides an example for performing arithmetic operations in an embodiment of the invention.

FIG. 6 depicts a method for word-by-word computation of Non-Reduced Montgomery Multiplication in an embodiment of the invention.

FIG. 7 depicts a method for computation of Non-Reduced Montgomery Multiplication in an embodiment of the invention.

FIG. 8 depicts a method for determining modular exponentiation in an embodiment of the invention.

FIG. 10 depicts an optimized method for determining Non-Reduced Montgomery Multiplication using a mix of scalar and vector instructions in an embodiment of the invention.

DETAILED DESCRIPTION

Figure 1:
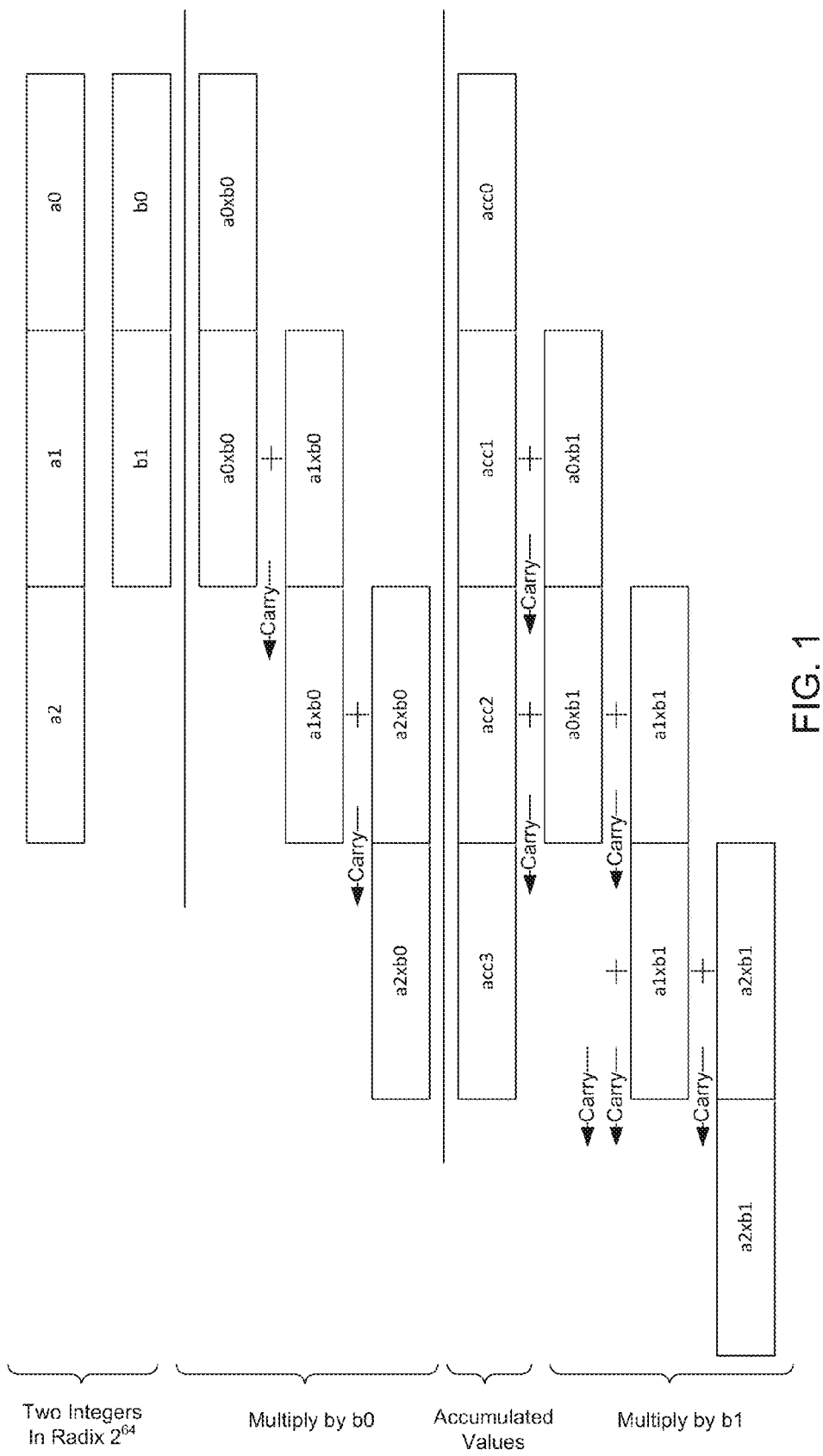
FIG. 1 depicts a method for carry propagation.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a method for computing modular exponentiation using a mix of vector and scalar instructions to accelerate various applications such as encryption protocols that rely heavily on large number arithmetic operations. The embodiment requires far fewer instructions to execute the operations than more conventional practices.

An embodiment includes a method for computing modular exponentiation using vector (SIMD) instructions, which outperforms conventional scalar (ALU) implementations. An embodiment accelerates RSA2048 protocols on various platforms, such as those that support SIMD instructions (e.g., AVX instruction sets). Embodiments are suitable for 1024 bit modular exponentiation and require far fewer instructions than conventional implementations (e.g., OpenSSL 1.0.1 implementation). This may "speed up" RSA2048 performance as well as the performance of other encryption protocols.

An embodiment includes an efficient method for using SIMD architecture for big-numbers arithmetic, such as that associated with modular exponentiation. The embodiment efficiently computes (a variant of) Montgomery Multiplications (and Squaring) and includes the balancing of the computational workload between the SIMD and ALU units. This resolves the bottlenecks that exist in a purely SIMD or purely ALU implementation.

An embodiment is used with a RSA cryptosystem having a 2n-bit modulus, $N=P \times Q$, where P and Q are n-bit primes. The 2n-bit private exponent is d. Decryption of a 2n-bit message C may require one 2n-bit modular exponentiation $C^d \mod N$. To use the Chinese Remainder Theorem (CRT), the following quantities are pre-computed: $d_1 = d \mod (P-1)$, $d_2 = d \mod (Q-1)$, and $Qinv = Q^{-1} \mod P$. Then, two n-bit modular exponentiations, namely $M_1 = C^{d_1} \mod P$ and $M_2 = C^{d_2} \mod Q$, are computed ($M_1$, $M_2$, $d_1$, $d_2$ are n-bit integers). The results are recombined by using $C^d \mod N = M_2 + (Qinv \times (M_1 - M_2) \mod P) \times Q$. Using the CRT, the computational cost of a 2n-bit RSA decryption is approximately twice the computational cost of one n-bit modular exponentiations. By construction (of the RSA keys), $2^{n-1} < P, Q < 2^n$.

A building block in modular exponentiation computations is modular multiplication, or an equivalent. An embodiment uses Non Reduced Montgomery Multiplication (NRMM), which is a variation of Montgomery Multiplication (MM). For MM, M is an odd integer (modulus), a, b are two integers such that $0 \le a, b < M$, and t is a positive integer (hereafter, all the variables are non-negative integers). The MM of a by b, modulo M, with respect to t, is defined by $MM(a,b) = a \times b \times 2^{-t} \mod M$. For NRMM, M is an odd integer (modulus), a, b are two integers such that $0 \le a, b < 2M$, and t be a positive integer such that $2^t > 4M$. The NRMM of a by b, modulo M, with respect to t, is defined by:

$$NRMM(a,b) = \frac{a \times b + ((-M^{-1} \times a \times b) \mod 2^t) \times M}{2^t}$$

$2^t$ is the Montgomery parameter. For the Non Reduced Montgomery Square, NRMM (a, a)=NRMSQR (a).

The following lemma (Lemma 1) shows how NRMM can be used, similarly to MM, for efficient computations of modular exponentiation. Let M be an odd modulus, a, b be two integers such that $0 \le a, b < 2M$, and t be a positive integer such that $2^t > 4M$. Then, NRMM(a, b)<2M and NRMM(a, 1)<M. To prove part a:

$$NRMM(a,b) < \frac{a \times b + 2^t \times M}{2^t} < \frac{2M \times 2M}{2^t} + M < \frac{4M^2}{4M} + M = 2M$$

To prove part b:

$$NRMM(a,1) < \frac{a + 2^t \times M}{2^t} < \frac{2M}{2^t} + M < \frac{1}{2} + M$$

The last inequality follows from $2^t > 4M$ and a<2M. Therefore, NRMM (a, 1) is fully reduced modulo M.

Lemma 1 (part a) shows the "stability" of NRMM: the output of one NRMM can be used as an input to a subsequent NRMM. Since NRMM(a, b) mod M=MM(a, b), it follows, from the bound in Lemma 1, that NRMM(a, b) is either MM(a, b) or MM(a, b)+M. Suppose $0 \le a, b < 2M$, $c2 = 2^{2t} \mod M$, a'=NRMM(a, c2), b'=NRMM(b, c2), u'=NRMM(a', b'), and u=NRMM(u', 1). Then, Lemma 1 implies a', b', u' are smaller than 2M, and $u = a \times b \mod M$.

This indicates how NRMM may be used for computing modular exponentiation in a way that is similar to the way in which MM is used. For a given modulus M, the constant $c2 = 2^{2t} \mod M$ can be pre-computed. Then, $a^x \mod M$ (for $0 \le a < M$ and some integer x) can be computed by: (a) mapping the base (a) to the (non reduced) Montgomery domain, a'=NRMM (a, c2), (b) using an exponentiation algorithm while replacing modular multiplications with NRMM's, and (c) mapping the result back to the residues domain, u=NRMM (u', 1).

An embodiment uses the following AVX2 vector operations: VPADDQ—addition of four 64-bit integer values, from one YMM register and four 64-bit values from another YMM register, and storing the result in a third YMM register; VPMULUDQ—multiplication of four 32-bit unsigned integer values, from one YMM register, by four 32-bit values from another YMM register, producing four 64-bit products into a third YMM register; VPBROADCASTQ—copying a given 64-bit value, four times, to produce a YMM register with four equal elements (with that value); VPERMQ—Permutes 64-bit values inside a YMM register, according to an 8-bit immediate value; and VPSRLQ/VPSLLQ—Shift 64-bit values inside a YMM register, by an amount specified by an 8-bit immediate value. However, other embodiments are not limited to these instructions.

SIMD instructions are designed to repeat the same operation on independent elements stored in a register. Therefore, SIMD instructions have an inherent difficulty with efficiently handling carry propagation associated with big-numbers arithmetic. As an example, the carry propagation in a (2 digit)×(3 digit) multiplication, is illustrated in FIG. 1.

FIG. 1 includes an illustration of a conventional carry propagation during a multiplication of integers A (3 digits: a0, a1, a2) and B (2 digits: b0, b1). The "schoolbook" method is used where each digit of A is multiplied by each digit of B, and the appropriate sub-products are aligned and summed accordingly. The digits of the partial sums are not independent of each other, due to the carry propagation, and thus SIMD architectures would require some cumbersome manipulations to handle such a flow. Thus, in FIG. 1 each "digit" occupies a full 64-bit register/memory location. In 64-bit architectures this is the largest scalar value that can be stored without an overflow. Multiplying two such digits results in 128-bit product, stored in two separate 64-bit registers. Adding two such digits may result in a 65-bit value. In that case the CPU sets a "carry flag" to indicate there was a carry out. This carry must be added to the next digit, which may also result in a carry, and so on.

Modular exponentiation can be translated to a sequence of NRMM/NRMSQR's. An embodiment optimizes these operations using vector instructions. The embodiment operates on "small" elements (e.g., less than $2^{32}$). This allows two big-numbers products to be summed up, without causing an overflow inside the 64-bit "container" that holds the digits of the accumulator. The cumbersome handling of the carry propagation can therefore be avoided. To this end, an embodiment works with an alternative representation of long (multi-digits) integers. Thus, when m is chosen to be less than 32 the products are 2m bits long. That means a 64-bit container will have 64-2m "unused" top bits. Therefore accumulation of, for example, sub-products may occur until those "unused" bits overflow. This will not happen until after at least 264-2m additions because each addition will at most add 1 to those bits.

Specifically, A is an n-bit integer, written in a radix $2^{64}$ as an I-digits integer, where I=[n/64], and where each 64-bit digit $a_i$ satisfies $0 \le a_i < 2^{64}$. This representation is unique (in the mathematical sense). Consider a positive m such that 1<m<64. A may be written in radix $2^m$ as:

$$A = \sum_{i=0}^{k-1} x_i \times 2^{m \times i}$$

This representation is unique (in the mathematical sense), and requires k=[n/m]>I digits, $x_i$, satisfying $0 \le x_i < 2^m$, for i=0 . . . k−1. See FIG. 2 for an example. In other words, each number is unique while represented in the standard convention of radix $2^{64}$.

When the requirement $0 \le x_i < 2^m$ is relaxed and the digits are allowed to satisfy only the inequality $0 \le x_i < 2^{64}$, then A is written in a Redundant-radix-$2^m$ Representation ("redundant representation"). This representation is not unique (in the mathematical sense). The redundant representation includes embedded digits of a number in a "container"/memory unit that is larger than necessary to store the digits. Thus, an embodiment converts from the regular representation (where each digit occupies exactly one 64 bit location and has exactly 64 significant bits, some of which may still be 0) to a redundant representation in radix $2^m$. Consequently there are more digits, each digit has only m bits, and each digit still occupies a 64 bit container.

Figure 2:
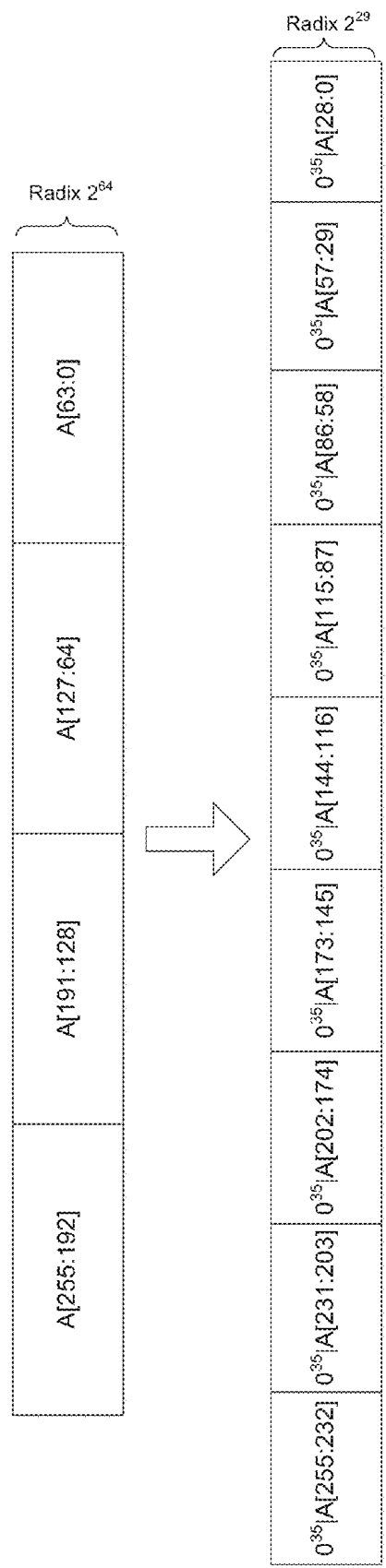
FIG. 2 depicts redundant representation in an embodiment of the invention.

As an example, FIG. 2 includes a 256-bit integer in radix $2^{64}$ (n=256, l=4) (top row) written in radix $2^{29}$ (m=29) using 9 digits (k=ceil(n/m)=9)(bottom row). Each digit is stored as a 64-bit "element" in a vector of k=9 elements. So in FIG. 2 the bottom row is in "normalized" redundant representation radix $2^{29}$. The representation is "normalized" because the top 35 bits are zeroed, and each digit is exactly 29 bits. Adding two such numbers would result in some digits becoming 30-bit, making it "non-normalized" redundant representation.

Returning to the above example regarding integer A, integer A written with k digits in redundant representation, satisfying $A<2^{m\times k}$, can be converted to a radix $2^m$ representation with the same number of digits (k), as shown in FIG. 3. For the method of FIG. 3 radix $2^m$ is the redundant representation when it is "normalized". The method addresses the "normalization" of a number who has some digits >m bits, and which needs to be fixed in order to be used in consecutive multiplication. After this process each digit becomes exactly m bits (i.e., the number is again "normalized").

Another example is now provided. Take n=1024 and the 1024-bit number $A=2^{1024}-105$. It has I=16 digits in radix $2^{64}$. The least significant digit is 0xFFFFFFFFFFFFFF97, and the other 15 digits are 0xFFFFFFFFFFFFFFFF. With m=28, A becomes a number with k=37 digits in radix $2^{28}$ the least significant digit is 0xFFFFF97, the most significant digit is 0xFFFF, and the rest are 0xFFFFFFF. For m=29, A becomes a number with k=36 digits in radix $2^{29}$ the least significant digit is 0x1FFFFF97 the most significant digit is 0x1FF and the rest are 0x1FFFFFFF.

Operations on integers that are given in redundant representation can be "vectorized", as follows: Let X and Y be two numbers given in redundant representation, such that $$X=\Sigma_{i=0}^{k-1} x_i \times 2^{m \times i},\ Y=\Sigma_{i=0}^{k-1} y_i \times 2^{m \times i},\ \text{with } 0 \leq x_i,$$
$$y_i < 2^{64}.\ \text{Let } t>0 \text{ be an integer.}$$

For the addition arithmetic operation: If $x_i+y_i<2^{64}$ for i=0, 1, . . . , (k−1), then the sum X+Y is given, in redundant representation, by:

$$X+Y=\Sigma_{i=0}^{k-1} z_i \times 2^{m \times i} \text{ with } z_i=x_i+y_i;\ 0 \leq z_i < 2^{64}.$$

For the arithmetic operation of multiplication by a constant: If $x_i \times t < 2^{64}$ for i=0, 1, . . . , (k−1), then the product t×X is given by $t \times X = \Sigma_{i=0}^{k-1} z_i \times 2^{m \times i}$ with $z_i = t \times x_i$; $0 \leq z_i < 2^{64}$.

FIG. 4 provides an example of the conversion to a redundant representation/format as well as arithmetic operations including addition and multiplication. Small numbers of 256 bits are selected. m is chosen to be 29, but other embodiments are not limited to 29. At first numbers A and B are in regular form (i.e., not in redundant representation), as each number includes four 64-bit digits. The most significant digit is on the left and the least significant on the right (i.e., big-endian format). Next A and B are transformed to normalized redundant representation=radix $2^{29}$. This results in a number with [256/29]=9 digits. Each digit is exactly 29 bits and occupies a 64-bit location (with room to spare). A is then added to B. The second digit from the left (0000000016b8f29f) became larger than 29 bits (e.g., see 29 bit digit 0000000001e5ee11 for comparison), so the oversized digit is normalized according to the method of FIG. 3, and the result is again radix $2^{29}$ representation. As another example, each of A and B is multiplied by "t", which is 31 bits. All of the digits overflow from the 29 bit boundary and are therefore normalized to radix $2^{29}$. Thus, the above examples show that many digits may be summed up before having to normalize values due to overflow (see FIG. 3). This contrasts with conventional methods such as those of FIG. 1.

Figure 5:
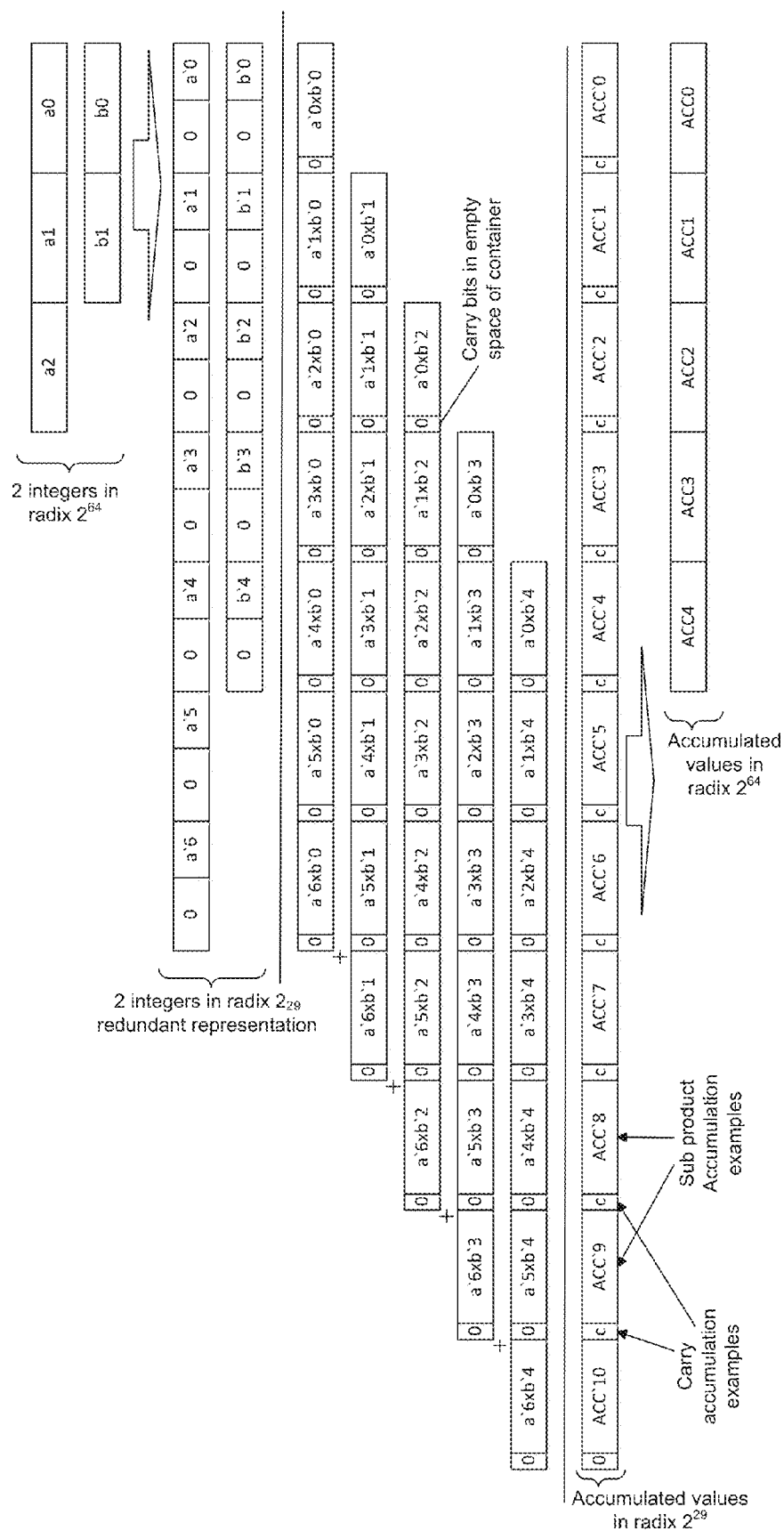
FIG. 5 depicts a method for carry propagation in an embodiment of the invention.

FIG. 5 provides an example of carry accumulation during a multiplication of two integers, A and B, using vectorized computations (compare to FIG. 1). Suppose m=29. A (3 digits) and B (2 digits) are first converted into redundant representation in radix $2^{29}$. In this representation, they have 7 and 5 digits, where each digit smaller than $2^{29}$, and is stored in a 64-bit container (SIMD element). Then, the sub-products are accumulated, while the carry bits spill into the "empty space" inside the 64-bit container (which is initially 0). In the end, the result is "normalized" back to a standard $2^m$ representation, according to the method of FIG. 3. This result can be fed to a consecutive multiplication, or transformed back to radix $2^{64}$. Thus, in FIG. 5 digits are smaller than 64/2 bits after conversion to redundant representation. The number of bits in each digit is denoted as m. Thus the product of two such digits is 2m at most. Note that 2m<64. Adding two 2m numbers may at most result in 2m+1 digit value. So m is chosen so the method can consecutively add several digits and still get accumulated result <64 bit (i.e., avoid overflow). FIG. 5 illustrates how redundant representation helps delay the carry propagation to the last stage of the multiplication FIG. 6 illustrates how NRMM can be computed in a "word-by-word" style. Note that $X=(A\times B+((-M^{-1}\times A\times B)\ \text{mod}\ 2^{k\times m})\times M)/2^{k\times m}$. Therefore, (a) follows immediately and (b) follows from Lemma 1. Note also that if B=1, then X mod $M=A\times B\times 2^{-I\times m}$ exactly. In step 2.5, X is divisible by $2^m$ due to steps 2.4-2.4 and the definition of $k_0$. The number of digits in the final result remains unchanged (k), because the result $X<2^{n+1}$, and k×m>n+2. In the redundant representation, steps 2.1 and 2.4 can be computed efficiently using vector instructions (VPMULUDQ). Steps 2.2 and 2.3 can be computed efficiently using scalar instructions, because they operate on a single digit. Thus, the method of FIG. 6 is useful for computing NRMM via a mix of scalar and vector instructions.

So in FIG. 6 step 2.1 and step 2.4 are broken up into scalar/vector parts. Many resource consuming calculations are performed on the least significant digit of X−x0 and the rest of the digits depend on it. Therefore in an embodiment the least significant digit is processed in the ALU (scalar), which makes very fast operations on this most important digit. The SIMD unit may not be ideal for operations on a single digit, and may get stalled if all values (e.g., including the least significant digit) are handled in the SIMD unit. So the embodiment uses ALU as shown above but also uses the SIMD unit to multiply and accumulate on the digits not handled by the ALU (e.g., digits other than the least significant digit).

As indicated above, scalar instructions are good for a series of serial operations, different from each other, on a single digit. SIMD instructions are good to perform the same operations on many digits. The bottleneck of the computations in the above example is in x0 (the least significant digit of x). The rest of the digits are the result of multiply-accumulate operations. Therefore the embodiment performs the demanding bottleneck operations in ALU and the rest of the multiply-accumulate operations are done in SIMD. This frees the ALU unit to handle the bottleneck. This embodiment prevents the SIMD from attempting to calculate bottleneck operations, which would adversely impact performance.

FIG. 7 shows an embodiment that uses scalar instructions to compute the low digits of X, and vector instructions for the other computations. To avoid a carry overflow, a "cleanup" procedure may be initiated, converting X to normalized $2^m$ representation.

In FIG. 7, computing NRMM (with the parameter m) assumes the inputs A, B and M are represented in redundant form, with each digit is strictly smaller than $2^m$ (we call it "normalized redundant representation"). An embodiment may integrate such a NRMM implementation into a "standard" implementation (e.g., transform the input/output from/to a regular (radix $2^{64}$) representation). The cost of such transformation is only a few tens of cycles, but if done for every NRMM, it can add up to a noticeable overhead. For efficiency, an embodiment transforms the inputs to a redundant form in the beginning of the exponentiation; carries out all the operations in the redundant form during the entire exponentiation; and in the end transforms the result back to the standard representation. This makes the overhead of the to-and-from transformation negligible while keeping a standard interface for the exponentiation function (transparent to the user).

An embodiment allows for a choice of parameters and optimizations. For example, certain encryption protocols may benefit from n=512, 1024, 2048, (for RSA1024, RSA2048, RSA4096, respectively). In one embodiment m=29 if n=512 or n=1024, and m=28 when n=2048.

To explain this choice of parameters, m=29 for n=1024 is larger than the value of m that is specified in Step 1 of the method of FIG. 8 (namely m=28). The correctness of the method of FIG. 8 can be maintained with different choices of m, as long as the "cleanup" steps are properly applied, to prevent any overflows beyond the range allowed by the 64 bits container. A tradeoff is a follows: a large m decreases the number of digits of the operands, which improves the efficiency of the computations. On the other hand, a large m requires a more frequent "cleanup" because fewer "spare" bits are left for accumulation.

In an embodiment where n=1024, choosing m=29 leads to 36 digits operands, which results in 58-bit products, and leaves only 6 "spare" bits for carry-accumulation. Therefore, cleanup is required after $2^6$=64 accumulations (i.e., every 32 iterations of the loop (Step 7) in the method of FIG. 7). For n=1024, this loop repeats 36 iterations so the cleanup is required only once. With m=28, there are 37 digits operands and 8 "spare" bits. Therefore the cleanup is required every 128 iterations of the loop allowing exponents of up to 3584 bits without any cleanup.

In an embodiment the cleanup step is optimized (shaving off only the necessary number of bits) and m=29 is the preferable parameter choice.

Thus, an embodiment chooses m where the smaller the m the more multiply-accumulate operations can be performed without overflow in the "unused" bits of the 64-bit container. The tradeoff is more "digits", because each digit becomes smaller and as a result—more operations. An embodiment may choose, automatically or in response to user input, m=28 and then perform $2^8$=256 multiply-accumulates. Where 8=64−2*m. An embodiment where m=29 is chosen allows only 64 accumulations. With this parameter the number of multiply-accumulates for 1024-bit NRMM is 72=36*2 (where 36=n/m). In such a situation a "cleanup" is performed, which is computationally cheap, a lesser value (e.g., m=28) may be chosen to reduce cleanup. M=28 would require 37 iterations.

An embodiment utilizes vector SIMD architecture such as the AVX family of instructions (AVX2). AVX2 is a SIMD architecture that can support vectorized NRMM implementation that can outperform pure scalar implementations. This is just an example and other architectures are suitable for other embodiments.

For simplicity, a schoolbook scenario is used to count the operations and the tradeoffs. Computing NRMM in redundant representation requires 2×[n/m]² single precision multiplications. Similarly, the scalar implementation (in radix $2^{64}$) requires 2×[n/64]² single precision multiplications. However, NRMM in redundant representation requires only one single precision addition per multiplication, whereas the scalar implementation requires three single precision add-with-carry operations.

For example, the 1024-bit NRMM using scalar implementation requires about 512 multiplications and about 1536 additions. The redundant implementation with m=29 requires about 2592 multiplications and about 2592 additions. The total number of multiplications and additions for the scalar implementation with radix $2^{64}$ is about 2048 and for the NRMM the instruction total is about 5184 instructions.

Consequently, vectorized code outperforms purely scalar implementations because in one embodiment the code runs on a SIMD architecture that can execute a factor of 2.53 more single precision operations than conventional scalar implementations. In other words, the embodiment uses a SIMD architecture that accommodates 2.53 digits (of 64 bits), implying registers of at least 162 bits. Thus, the embodiment may work with registers of 256 bits (4 digits) with the appropriate integer instructions and provides fast vectorized performance.

As indicated above, scalar instructions are good for a series of serial operations, different from each other, on a single digit. SIMD instructions are good to perform the same operations on many digits. The bottleneck of the computations in the above example is in x0 (the least significant digit of x). The rest of the digits are the result of multiply-accumulate operations. Therefore the embodiment performs the demanding bottleneck operations in ALU and the rest of the multiply-accumulate operations are done in SIMD. This frees the ALU unit to handle the bottleneck. This embodiment prevents the SIMD from attempting to calculate bottleneck operations, which would adversely impact performance.

Figure 9:
FIG. 9 depicts a method for determining Non-Reduced Montgomery Multiplication using a mix of scalar and vector instructions in an embodiment of the invention.

FIG. 7 shows an embodiment that uses scalar instructions to compute the low digits of X, and vector instructions for the other computations. Implementing NRMM, as in the method of FIG. 7, is performed as illustrated in FIG. 9. For FIG. 9 the small squares signify a single digit in an ALU register (GPR). The long rectangles imply the rest of the digits are in a SIMD register/several SIMD registers. The operations near the small squares show the operations performed in ALU: $A_0$ is multiplied by Bi and accumulated into $X_0$ (the next digit of B in schoolbook multiplication (step 7.1 of FIG. 7). In parallel the embodiment multiplies the rest of the digits of A, by Bi, and accumulates as described in steps 7.2-7.3. In the ALU the embodiment multiplies $X_0$ by $K_0$ mod $2^m$ (step 7.4). Then the embodiment multiplies and accumulates $M_0$ by $y_0$ into $X_0$ in ALU (step 7.5) and the rest of the digits in SIMD (steps 7.6-7.7). The embodiment shifts the value of $X_0$ by m, and the rest of the number are shifted by 64, with the left-most digit value added to $X_0$ (steps 7.8-7.10). Thus, in one embodiment vector and scalar instructions are operated simultaneously. For example, this occurs in an embodiment using an Intel® out-of-order architecture.

Regarding FIG. 9, two bottlenecks may exist in that implementation: (1) the expensive right shifting of a vector (of digits) across several registers; and (2) the latency between the computation of $y_0$ (in step 7.4 of FIG. 7), followed by broadcasting to a SIMD register, and the point in time where the multiplications in step 7.7 can start.

To address these bottlenecks, an embodiment uses the following optimizations. Instead of right shifting X, the embodiment keeps the values $A_q \ldots A_1$ and $M_q \ldots M_1$ in memory, and uses "unaligned" VPMULUDQ operations with the proper address offset. To do this correctly, the operands A and M are padded with zeroes. For the second bottleneck, the embodiment preemptively calculates a few digits, using ALU instructions, to achieve a better pipelining of the ALU and SIMD units.

Figure 11:
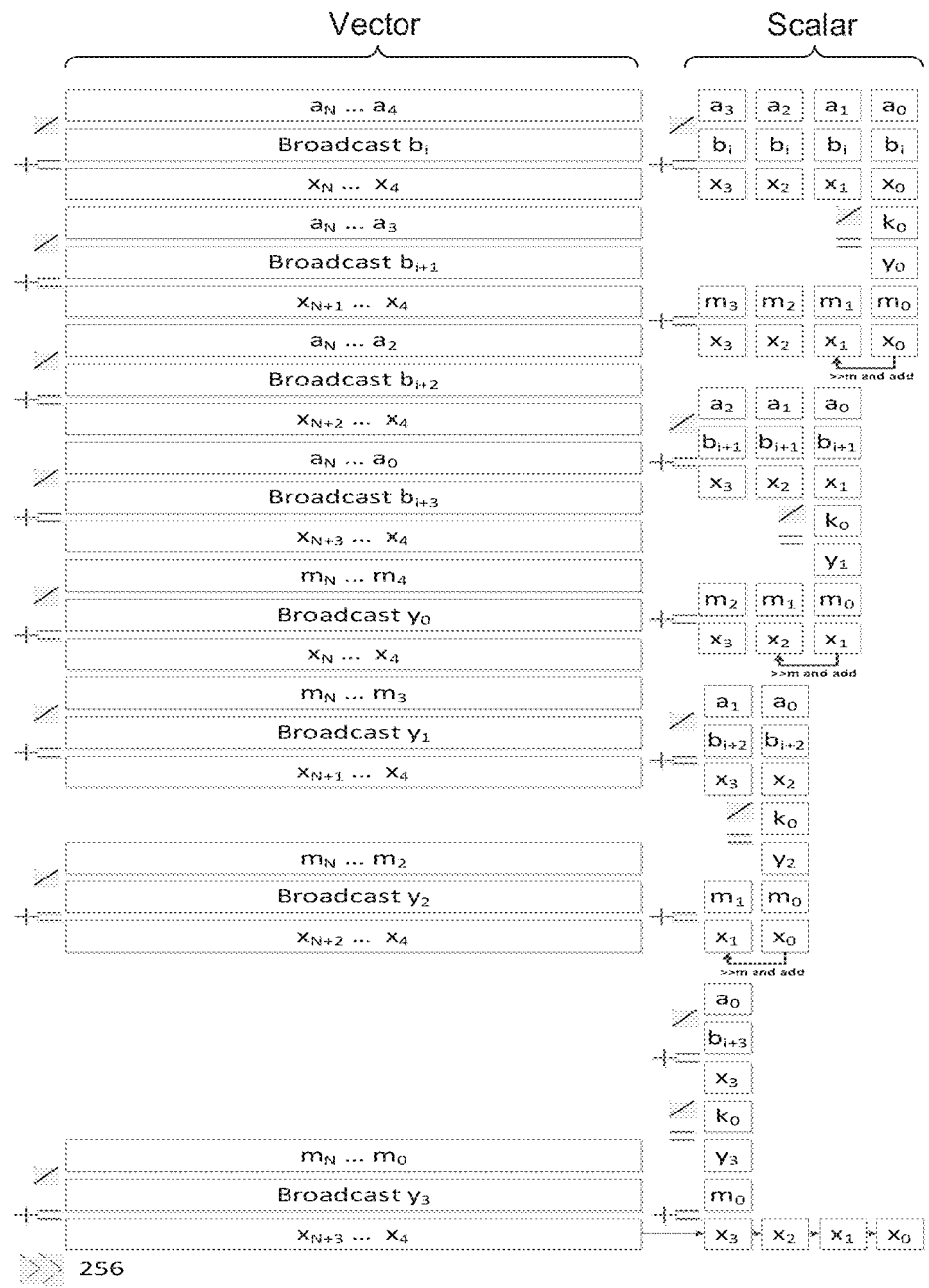
FIG. 11 depicts a method for determining Non-Reduced Montgomery Multiplication using a mix of scalar and vector instructions in an embodiment of the invention.

These optimizations are illustrated, schematically, in FIG. 11. FIG. 10 includes optimized NRMSQR code using a combination of vector and scalar instructions.

In one embodiment modular exponentiation involves NRMM, the majority of which are of the form NRMM(A,A). The embodiment therefore adds dedicated optimization for this case and calls it NRMSQR. Unlike NRMM, where the operations are interleaved, the function NRMSQR(A) starts with calculating $A^2$, followed by a Montgomery Reduction. An embodiment employs a big-numbers squaring method involving creating a copy of A, left shifted by 1. In the redundant representation, this operation includes left shifting by 1, of each element. Subsequently, the elements of A, and "A<<1" are multiplied.

For FIG. 11, the squares show the values in ALU registers and the rectangles show the values in SIMD registers. The embodiment loads the 4 lower digits of A into GPRs and keeps them there. The rest of the digits are processed in the SIMD unit. All digits are multiplied by $b_i$, some in the ALU some in the SIMD. $Y_0$ is calculated from $x_0$. M is multiplied by $y_0$ and accumulated into x. Now, unlike in FIG. 9, the embodiment does not shift the entire vector right by 64 but instead shifts only $x_0$ right by m, and adds it to $x_1$. Now effectively $x_1$ becomes $x_0$, and $x_{i+1}$ becomes $x_i$.

Afterwards the embodiment continues the same way with three digits in ALU and the rest in the SIMD unit. Again a shift of the vector is saved, and $x_1$ is shifted and added to $x_2$. Now $x_2$ is effectively $x_0$. The embodiment continues until it saves exactly 4 shifts of vector by 64. 4 shifts by 64 is 1 shift by 256, and 256 is the size of the SIMD register in AVX2. The embodiment therefore does not need to shift at all, but move the registers (or rename them). The final value is the same as before but the embodiment saved the expensive SIMD shifts. Moreover the load-balance between ALU and SIMD is improved and both units are kept busy.

Thus, an embodiment includes a method for computing modular exponentiation and accelerating software performance of RSA on processors. An embodiment utilizes SIMD architecture and a balance between scalar and vector operations. The embodiment nets a significant performance gain. An embodiment using one of the above vectorization methods is scalable, and can gain performance from wide SIMD architectures. Also, embodiments may use, for example, AVX/SSE architectures and the like. This achieves a significant performance gain for processors that have AVX/SSE instructions and 32-bit ALU unit (e.g., Atom® processors).

While embodiments above have addressed modular exponentiation and RSA-based cryptography, other embodiments are not so limited and may address varying technologies and protocols. For example, other embodiments may be used with modular exponentiation based schemes such as Diffie-Hellman key exchange and digital signature algorithm (DSA) embodiments. Still other embodiments may be used for elliptic curve cryptography (ECC) over a prime field, and the like.

As mentioned above, embodiments are suitable for 1024 bit modular exponentiation and require far fewer instructions than conventional implementations (e.g., OpenSSL 1.0.1 implementation). This may "speed up" RSA2048 performance as well as the performance of other encryption protocols. However, embodiments are suitable for any size and even improve for larger sizes. Thus, the 1024-bit exponentiation is provided as an example only because it may be used for RSA2048.

Figure 12:
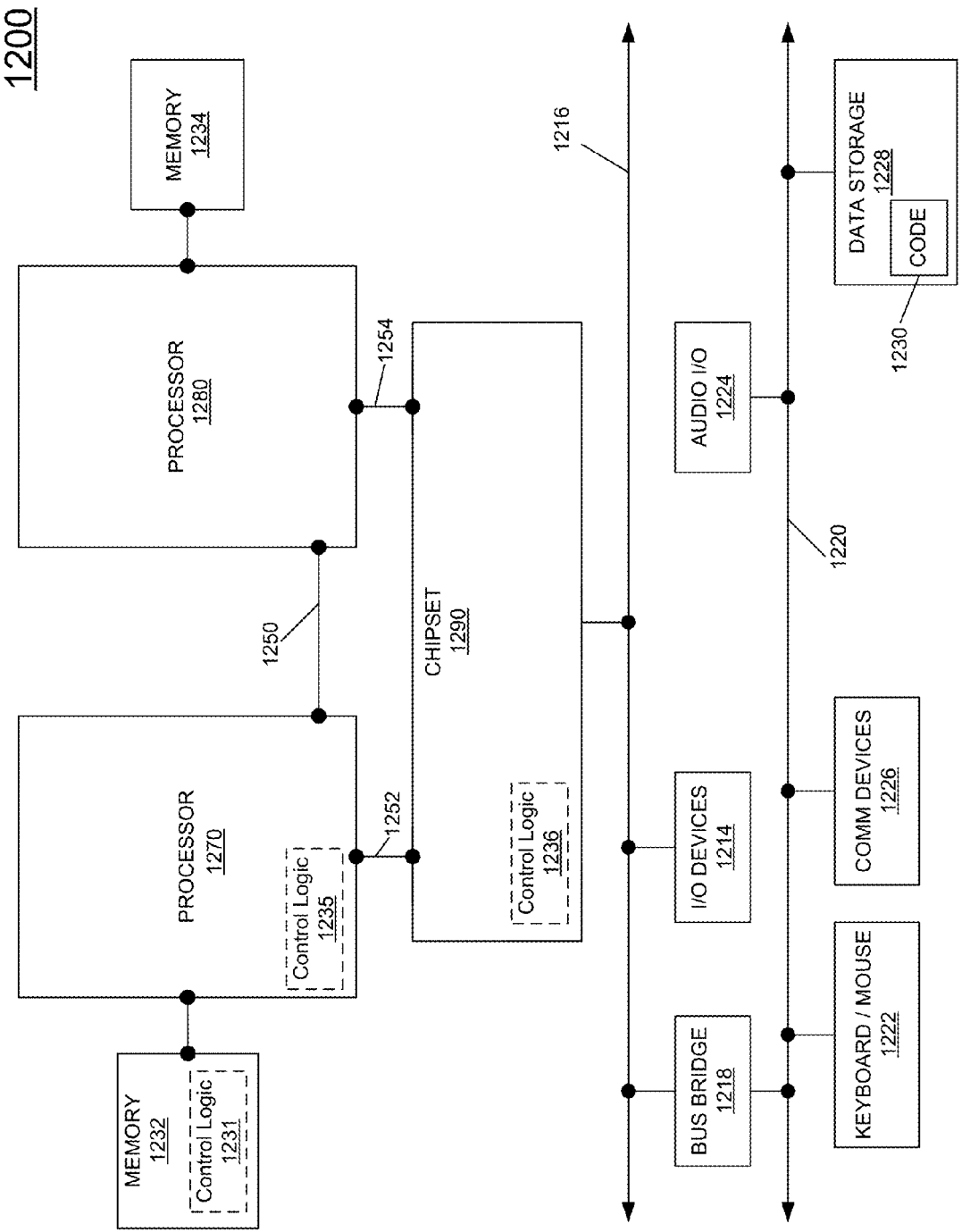
FIG. 12 includes a system for use with various embodiments of the invention.

Embodiments may be implemented in many different system types. Referring now to FIG. 12, shown is a block diagram of a system in accordance with an embodiment of the present invention that may be found in, for example, a laptop, notebook, ultrabook, Smartphone, personal digital assistant, desktop, mobile computing device, and the like. Multiprocessor system 1200 is a point-to-point interconnect system, and includes a first processor 1270 and a second processor 1280 coupled via a point-to-point interconnect 1250. Each of processors 1270 and 1280 may be multicore processors. The term "processor" may refer to any device or portion of a device that processes electronic data from registers and/or memory to transform that electronic data into other electronic data that may be stored in registers and/or memory. First processor 1270 may include a memory controller hub (MCH) and point-to-point (P-P) interfaces. Similarly, second processor 1280 may include a MCH and P-P interfaces. The MCHs may couple the processors to respective memories, namely memory 1232 and memory 1234, which may be portions of main memory (e.g., a dynamic random access memory (DRAM)) locally attached to the respective processors. First processor 1270 and second processor 1280 may be coupled to a chipset 1290 via P-P interconnects, respectively. Chipset 1290 may include P-P interfaces. Furthermore, chipset 1290 may be coupled to a first bus 1216 via an interface. Various input/output (I/O) devices 1214 may be coupled to first bus 1216, along with a bus bridge 1218, which couples first bus 1216 to a second bus 1220. Various devices may be coupled to second bus 1220 including, for example, a keyboard/mouse 1222, communication devices 1226, and data storage unit 1228 such as a disk drive or other mass storage device, which may include code 1230, in one embodiment. Code may be included in one or more memories including memory 1228, 1232, 1234, memory coupled to system 1200 via a network, and the like. Further, an audio I/O 1224 may be coupled to second bus 1220.

Embodiments may be implemented in code and may be stored on at least one storage medium having stored thereon instructions which can be used to program a system to perform the instructions. The storage medium(s) may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (1235). However, in another embodiment, logic also includes software or code (1231). Such logic may be integrated with hardware, such as firmware or micro-code (1236). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

An embodiment includes a method comprising: converting first and second integers from a first format to a second format; wherein the first and second integers each have more digits in the second format than in the first format and each of the digits in the second format is smaller in bit size than in the first format; performing an arithmetic operation between the first and second converted digits using both scalar and vector instructions; and determining a modular exponentiation (ME) based on the arithmetic operation. An embodiment includes determining an encryption value based on the ME. An embodiment includes the method, wherein the digits in the first format are stored in equally sized first containers, the method comprising storing the digits in the second format in equally sized second containers that are equal in size to the first containers. An embodiment includes storing a carry value, generated using the vector instructions, in an unused portion of one of the second containers. In an embodiment the first format includes a first radix value, the second format includes a second radix value that is higher than the first radix value, and the second format is redundant. In an embodiment the arithmetic operation using the scalar instructions comprises performing arithmetic and logic (ALU) instructions, and performing the arithmetic operation using the vector instructions comprises simultaneously performing single instruction, multiple data (SIMD) instructions. In an embodiment performing the arithmetic operation using the vector instructions comprises simultaneously performing the arithmetic operation on multiple digits in the second format. In an embodiment the first integer in the first format has a first total number of digits extending to and including most significant and least significant digits, the first integer in the second format has a second total number of digits extending to and including most significant and least significant digits, and the second total number of digits exceeds the first total number of digits. An embodiment includes determining first and second sub-products generated using the vector instructions; determining a first carry value for the first sub-product; and summing the first and second sub-products independently of the first carry value. An embodiment includes determining first and second sub-products generated using the vector instructions; determining first and second carry values respectively for the first and second sub-products; summing the first and second sub-products to determine a sum of sub-product values; and summing the first and second carry values to determine a sum of carry values. An embodiment includes determining an accumulated valued based on the sum of sub-product values and the sum of carry values; and formatting the accumulated value in the first format. An embodiment includes performing the arithmetic operation on least significant digits of the first and second converted digits using the scalar instructions; and performing the arithmetic operation on most significant digits of the first and second converted digits using the vector instructions. An embodiment includes at least one machine readable medium comprising a plurality of instructions that in response to being executed on a computing device, cause the computing device to carry out a method according to any one of the above embodiments of this paragraph. An embodiment includes a communications device arranged to carry out a method according to any one of the above embodiments of this paragraph. An embodiment includes an apparatus comprising means for performing any one of above embodiments of this paragraph.

An embodiment includes an apparatus comprising: a memory; at least one processor, coupled to the memory, to perform operations comprising: converting first and second integers from a first format to a second format; wherein the first and second integers each have more digits in the second format than in the first format and each of the digits in the second format is smaller in bit size than in the first format; performing an arithmetic operation between the first and second converted digits using both scalar and vector instructions; and determining a modular exponentiation (ME) based on the arithmetic operation. In an embodiment the digits in the first format are stored in equally sized first containers, the operations comprising: storing the digits in the second format in equally sized second containers that are equal in size to the first containers; and storing a carry value, generated using the vector instructions, in an unused portion of one of the second containers. In an embodiment performing the arithmetic operation using the vector instructions comprises simultaneously performing the arithmetic operation on multiple digits in the second format. An embodiment includes: determining first and second sub-products generated using the vector instructions; determining a first carry value for the first sub-product; and summing the first and second sub-products independently of the first carry value An embodiment includes performing the arithmetic operation on least significant digits of the first and second converted digits using the scalar instructions; and performing the arithmetic operation on most significant digits of the first and second converted digits using the vector instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. At least one non-transitory machine readable medium comprising a plurality of instructions that in response to being executed on a computing device, cause the computing device to carry out a method comprising:
   converting first and second integers from a first format to a second format; wherein the first and second integers each have more digits in the second format than in the first format and each of the digits in the second format is smaller in bit size than in the first format;
   performing an arithmetic operation between the first and second converted digits using both scalar and vector instructions; and determining a modular exponentiation (ME) based on the arithmetic operation.

2. The at least one medium of claim 1, the method comprising determining an encryption value based on the ME.

3. The at least one medium of claim 1, wherein the digits in the first format are stored in equally sized first containers, the method comprising storing the digits in the second format in equally sized second containers that are equal in size to the first containers.

4. The at least one method of claim 3, wherein:
performing the arithmetic operation using the vector instructions comprises generating a carry value; and
the method comprises storing the carry value in an unused portion of one of the second containers.

5. The at least one method of claim 3, wherein the first format includes a first radix value, the second format includes a second radix value that is unequal to the first radix value, and the second format is redundant.

6. The at least one method of claim 1, wherein performing the arithmetic operation using the scalar instructions comprises performing arithmetic and logic (ALU) instructions, and performing the arithmetic operation using the vector instructions comprises simultaneously performing single instruction, multiple data (SIMD) instructions.

7. The at least one medium of claim 1, wherein performing the arithmetic operation using the scalar and vector instructions comprises simultaneously performing the arithmetic operation on multiple digits in the second format and simultaneously performing the scalar and vector instructions.

8. The at least one medium of claim 1, wherein the first integer in the first format has a first total number of digits extending to and including most significant and least significant digits, the first integer in the second format has a second total number of digits extending to and including most significant and least significant digits, and the second total number of digits exceeds the first total number of digits.

9. The at least one medium of claim 1, wherein:
performing the arithmetic operation using the vector instructions comprises generating first and second sub-products; and
the method comprises: determining a first carry value for the first sub-product; and summing the first and second sub-products independently of the first carry value.

10. The at least one medium of claim 1, wherein:
performing the arithmetic operation using the vector instructions comprises generating first and second sub-products; and
the method comprises:
determining first and second carry values respectively for the first and second sub-products;
summing the first and second sub-products to determine a sum of sub-product values; and
summing the first and second carry values to determine a sum of carry values.

11. The at least one medium of claim 10, the method comprising:
determining an accumulated valued based on the sum of sub-product values and the sum of carry values; and
formatting the accumulated value in the first format.

12. The at least one medium of claim 1, the method comprising:
performing the arithmetic operation on least significant digits of the first and second converted digits using the scalar instructions; and
performing the arithmetic operation on most significant digits of the first and second converted digits using the vector instructions.

13. An apparatus comprising:
at least one memory;
at least one processor, coupled to the memory, to perform operations comprising:
converting first and second integers from a first format to a second format; wherein the first and second integers each have more digits in the second format than in the first format and each of the digits in the second format is smaller in bit size than in the first format;
performing an arithmetic operation between the first and second converted digits using both scalar and vector instructions; and
determining a modular exponentiation (ME) based on the arithmetic operation.

14. The apparatus of claim 13, wherein the digits in the first format are stored in equally sized first containers and the operations comprise:
storing the digits in the second format in equally sized second containers that are equal in size to the first containers; and
storing a carry value, generated using the vector instructions, in an unused portion of one of the second containers.

15. The apparatus of claim 13, wherein performing the arithmetic operation using the vector instructions comprises simultaneously performing the arithmetic operation on multiple digits in the second format.

16. The apparatus of claim 13, wherein
performing the arithmetic operation using the vector instructions comprises generating first and second sub-products; and
the operations comprise: determining a first carry value for the first sub-product; and summing the first and second sub-products independently of the first carry value.

17. The apparatus of claim 13, wherein the operations comprise:
performing the arithmetic operation on least significant digits of the first and second converted digits using the scalar instructions; and
performing the arithmetic operation on most significant digits of the first and second converted digits using the vector instructions.

18. A method executed by at least one processor comprising:
converting first and second integers from a first format to a second format; wherein the first and second integers each have more digits in the second format than in the first format and each of the digits in the second format is smaller in bit size than in the first format;
performing an arithmetic operation between the first and second converted digits using both scalar and vector instructions; and
determining a modular exponentiation (ME) based on the arithmetic operation.

19. The method of claim 18, wherein:
performing the arithmetic operation using the vector instructions comprises generating first and second sub-products;
the method comprises: determining a first carry value for the first sub-product; and summing the first and second sub-products independently of the first carry value.

20. The method of claim 18, wherein performing the arithmetic operation using the scalar instructions comprises performing arithmetic and logic (ALU) instructions, and performing the arithmetic operation using the vector instructions comprises simultaneously performing single instruction, multiple data (SIMD) instructions.

* * * * *